E. H. N. BONNET.
AUTOMOTOR HARVESTING MACHINE.
APPLICATION FILED JULY 8, 1915.

1,217,906.

Patented Mar. 6, 1917.
3 SHEETS—SHEET 1.

Witnesses:

Inventor
Ernest Henri Narcisse Bonnet
By Attorneys,

E. H. N. BONNET.
AUTOMOTOR HARVESTING MACHINE.
APPLICATION FILED JULY 8, 1915.

1,217,906.

Patented Mar. 6, 1917.
3 SHEETS—SHEET 3.

Witnesses:

Inventor:
Ernest Henri Narcisse Bonnet
By Attorneys,

UNITED STATES PATENT OFFICE.

ERNEST HENRI NARCISSE BONNET, OF NONANCOURT, FRANCE.

AUTOMOTOR HARVESTING-MACHINE.

1,217,906.   Specification of Letters Patent.   Patented Mar. 6, 1917.

Application filed July 8, 1915. Serial No. 38,832.

*To all whom it may concern:*

Be it known that I, ERNEST HENRI NARCISSE BONNET, a citizen of the Republic of France, residing in Nonancourt, Eure, France, have invented certain new and useful Improvements in Automotor Harvesting-Machines, of which the following is a specification.

The subject matter of the present invention is an auto-motor harvesting machine, which is more particularly set up in such a way that the vehicle can be stopped while allowing the mechanism of the working parts to be actuated by the motor, and this offers the great advantage of allowing the easy bringing about of the cleaning of the machine if it becomes clogged. It offers also this feature: that the working parts can be completely uncoupled when the machine is moved from one place to another as an automobile.

This machine is made up of a front train or tractor with two driving and steering wheels, upon which is preferably placed any motor whatever, and of a rear train or trailer which forms the harvester proper, which can be a mower, a binder, a stripper, &c., and comprises the parts with which ordinarily these machines are provided, the movement of the motor being transmitted to the said rear train, as well as the mechanisms which control the several parts by means of an appropriate gear, or chain, or electric transmission. The transmission is brought about in such a way that the mechanician can unclutch the driving wheels for stopping the vehicle while at the same time allowing the working parts to operate.

Arrangements are moreover provided, for allowing the complete uncoupling of the entire mechanism in going forward, with the exception of the driving wheels, which remain actuated by the motor, so that the vehicle can be moved by its own means without doing any work, and also for permitting this uncoupling when the vehicle is made to go backward.

It is to be noted that the arrangements which form the subject of the invention can be very easily applied to any existing harvesting machine without being obliged to introduce into it important modifications.

The description which follows, in connection with the annexed drawing, given by way of example, will make easily understood the manner in which this invention has been carried out.

Figure 1:
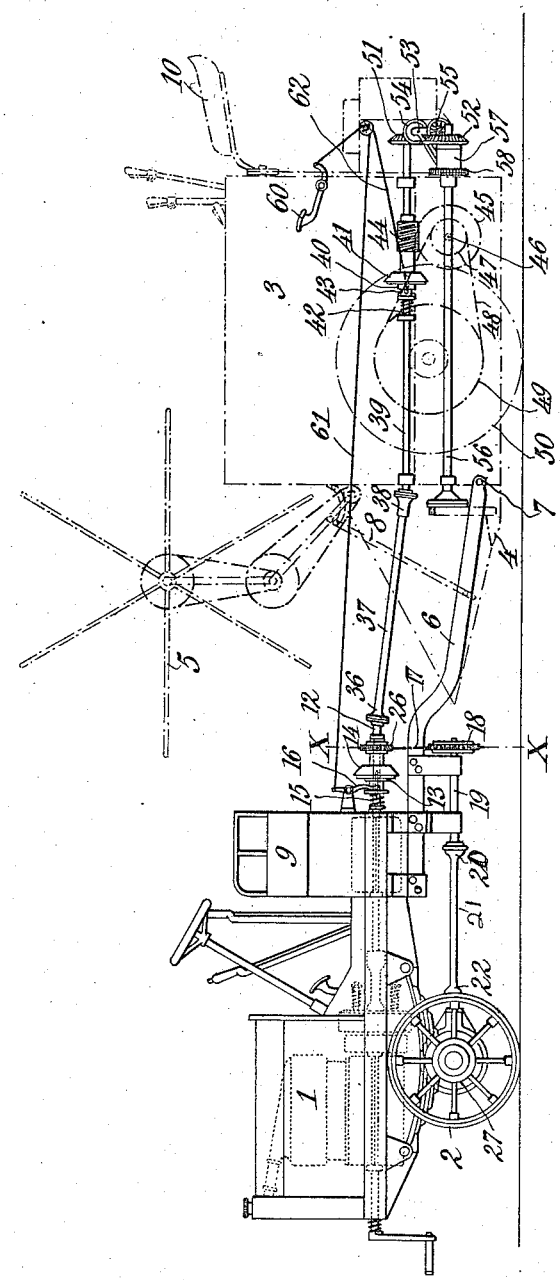
Figure 1 is a side elevation of an automotor harvester binder built according to the invention; the parts not relating directly to the invention being represented in broken lines.
Figure 2:
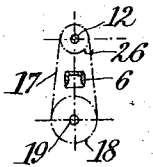
Fig. 2 is a diagrammatic section along the line X—X of Fig. 1.
Figure 3:
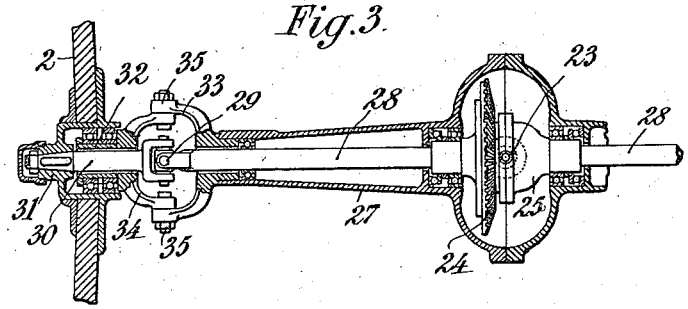
Fig. 3 is a vertical and longitudinal section on a larger scale of the front axle bridge.
Figure 4:
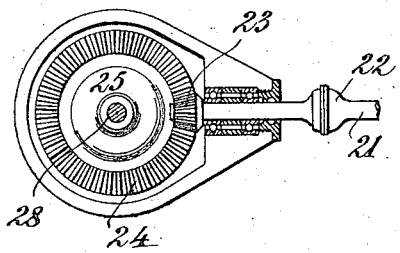
Fig. 4 is an interior view of the differential box of this front axle bridge.
Figure 5:
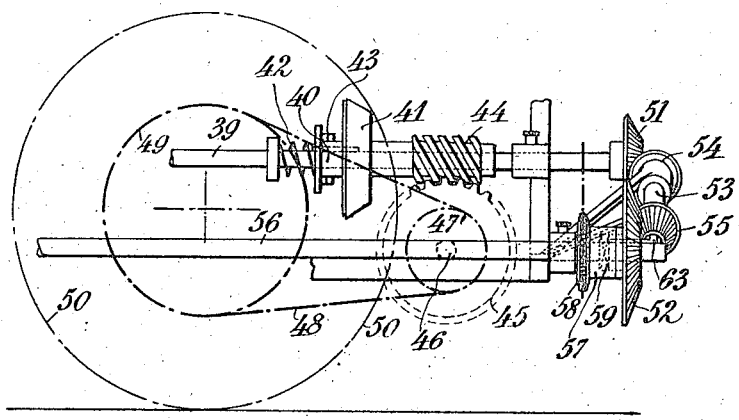
Fig. 5 is an elevation also on a larger scale, of a portion of the transmission and controlling mechanism of the trailer.

The machine comprises on the one hand a front train or tractor 1 upon which is placed the motor with all the usual control devices, such as change of speed and direction, provided with two driving and steering wheels 2, and on the other hand a rear train or trailer 3 which forms the harvester binder proper and comprises the ordinary working parts of these machines, cutter bar 4, beater 5, binder, endless aprons, &c. These two parts are joined together by a shaft 6 joined at 7 to the rear train and provided like the shafts of harvesters moved by animals, with a structure not represented upon the drawing, the rear train being provided like the ordinary harvester binders with a leveling device 8 allowing of controlling its inclination and the height of the cut.

Upon the seat 9 of the front train is seated the driver of the vehicle, while the mechanician charged with directing the work, is installed as usual upon a seat 10 provided on the rear train.

The movement of the engine is transmitted to the front wheels 2, as will be explained: on the shaft 12 starting from the differential box represented in dotted lines (Fig. 1) there is mounted an elastic clutching device operating by friction or clutches. This clutch comprises a part 13 constantly driven by the shaft 12, but capable of sliding upon it, and a part 14 mounted idly upon this shaft 12, but not being capable of being displaced longitudinally. The part 13 is normally maintained in contact with the part 14 by means of a spring 15, but it can be separated from it by the action of a fork 16. On the idle part 14 there is keyed a toothed wheel 26 capable of driving by means of a chain 17, another wheel 18 of greater diameter, according to the ratio of reduction. This wheel 18 is placed under the shaft 6 and upon the vertical axis passing through the center of the shaft 12 in such a way that the chain 17 is displaced from and does not touch this shaft 6. The wheel 18 is keyed upon the shaft 19 connected by a universal joint 20 to a transmission shaft 21, which, by means of another universal joint 22, can drive the shaft of the beveled pinion 23 engaging the toothed crown 24 integral with a differential 25 journaled in the central box of the front axle bridge 27. From the differential there start in the ordinary manner two distinct shafts 28, which are each connected by a universal joint 29 to an axle 30 made fast by means of a keyed sleeve 31 or by grips to the hub of the driving wheel 2. This axis 30 traverses the sleeve 32 upon which rolls the wheel 2. It is understood that when the shaft 12 is driven and when the pieces 13 and 14 are in engagement, the wheels 2 are actuated.

In order to allow the steering movement of the front driving wheels the bridge 27 is broken at each end and forms on each side a fork 33, upon which another fork 34 integral with the sleeve 32 is joined about two vertical axes 35 so situated that the axis of one forms a prolongation of the axis of the other, forming the steering pivot, and which is located in the vertical axis of the universal joint 29.

As in front train motors, the wheels 2 are connected to the steering control by means of one of the systems of suitable connecting rods which are well known as regards their principle.

The wheels can carry, moreover, on the inside, brakes which are not represented and which can also be, like their controlling devices, one of the wellknown systems, such as are employed on the front driving trains of automobiles.

For transmission of movement to the rear train the shaft 12 is connected by a universal joint 36 to a shaft 37, which by means of another universal joint 38 can drive an auxiliary horizontal shaft 39 carried by the rear train. The shaft 37 is mortised on the joint 38 by a square section shaft arrangement allowing easy and rapid demounting. The shaft 39 transmits the movement in the following manner: First to the driving wheel or driving wheels of the rear train through the intermediation of a clutch device, and then to the different working parts.

On the shaft 39 and toward its end opposite to the universal joint 38 there is mounted a clutching device similar to the one previously described comprising a sliding part 40 normally maintained in engagement with an idle part 41 by means of a spring 42, the action of which can be overcome by the displacement of a fork 43. The idle portion carries externally a worm 44 meshing with a worm wheel 45 keyed upon a transverse shaft 46, carrying, moreover, a toothed wheel 47 adapted to drive by the intermediation of a chain 48 and of another toothed wheel 49, the driving wheel 50 of the rear train.

Moreover, beyond the clutching device the shaft 39 carries a beveled wheel 51 which drives another beveled wheel 52 by means of another transverse shaft 53 carrying two beveled pinions 54, 55, meshing with the wheels 51, 52.

Figure 6:
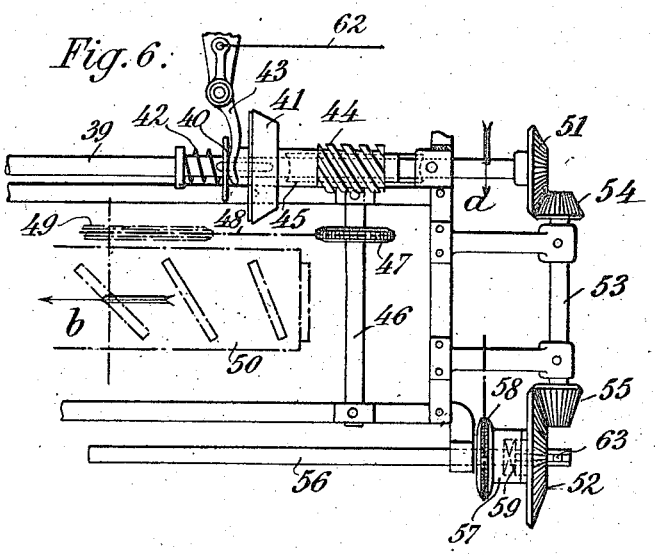
Fig. 6 is a plan view of Fig. 5.

The wheel 52 is keyed to the extremity of a shaft 56 parallel to the shaft 39 and actuating the cutting bar in the wellknown manner, by means of a crank disk and a driving shaft. At the side of the wheel 52 there is mounted a sleeve 57 idle upon the shaft 56. It carries a toothed wheel 58 designed to transmit by means of a chain, the movement to the different working parts of the machine, the beater, binder, endless aprons, &c. Between the hub of the toothed wheel 52 and of the wheel 57 there is interposed a one-way clutch 59 formed, for example, by means of a free wheel or ratchet and pawl device which controls the driving of the pinion 58 in the single direction of rotation of the shaft 56, namely, the direction corresponding to the going forward indicated by the arrows $a$, $b$ in Fig. 6.

The control of the two clutching devices 13, 14 and 40, 41 is performed by the mechanician seated upon the seat 10, by means of a pedal 60 which is connected by guide cables 61 and 62 connected to the forks 16 and 43.

As is easily understood, if the two parts of the clutch devices are in engagement the movement of the motor is transmitted not only to the mechanisms of the driving parts, but also to the driving wheels 2 and 50 in case of the normal running forward. If, on the other hand, these arrangements are unclutched, only the working devices of the machine are actuated, movement not being transmitted to the driving wheels. The mechanician can therefore, acting upon the pedals 60, stop the vehicle without the working devices being stopped in such a way that if the binder, for instance, is clogged, he can easily clear it, which would not be possible to be done if the machine continued to advance, which was very difficult of execution when the working devices were also stopped, as is the case in ordinary animal traction machines.

In certain machines of the same class with animal traction in which the mechanism of the working parts was actuated by the movement of the wheels themselves, the movement of which proceeded from adhesion with the ground, there have existed clutching devices keyed between these wheels and the said mechanism, and which had the purpose of preventing accidents, if, while the mechanician was in the course of repairing the machine or of cleaning it, the horses started forward. This evidently has no connection with the arrangement described above, since when the vehicle has stopped the mechanism of the working parts continues to work.

If for any reason whatever it is necessary to go backward, which the usual change gears of the front train easily allow, the movement will be transmitted to the driving wheels by the transmission turning in an inverse direction, on condition of course, that the devices 13, 14, 40 and 41, are clutched, but this movement will not be transmitted to the driving mechanism, since on account of the pawl device 59 the idle pinion 58 will not turn in the direction of rotation of the shaft 56 corresponding to running backward. This does away with the defects which would result from the working in the reverse direction of the parts of the binder.

Finally, it is advantageous to mount the pawl device 59 so that by means of a suitable device 63 we can render it inoperative so that even during the forward travel the movement is not transmitted to the driving parts of the binder, and this has the advantage of allowing the movement of the machine by its own means from one point to another as an ordinary automobile vehicle would do, the working devices being all stopped since the cutter bar can be unclutched also in the ordinary manner by disconnecting its driving shaft. This uncoupling of the driving shaft can also be done in case of running backward.

The transmission is brought about according to the device to be controlled by means of a suitable reduction.

For transporting the harvesting machine to a great distance it is sufficient first to separate the front train from the hind train, then to "pack" the harvesting machine proper in the wellknown manner, that is to have it rest at a position of 90° from its normal position, upon a train of auxiliary wheels adapted to serve as carrying wheels, the normal wheels being raised a little above the ground by a device of special use provided for this purpose, in order to attach the shaft 6 under the table of the platform.

All of the above described arrangements for the harvester binder can be applied, whatever may be the type of machine, for example, they can be employed for a simple mower, for harvester strippers, &c.

It will be understood that in this specification and in the claims I use the terms "harvester" and "harvesting machine" in a generic sense to cover any means for cutting hay or grain, and irrespective of whether the apparatus comprises other means such as a stripper, binder or the like.

Claims:

1. An auto-motor harvesting machine comprising a front tractor and a rear trailer, the tractor comprising motor driven and controlling means, and the trailer comprising the harvester, combined with connections for transmitting rotary motion from the motor to the trailer and control mechanism on the trailer for controlling the application of power to the harvester.

2. An auto-motor harvesting machine comprising a front tractor and a rear trailer, the tractor comprising motor driven and controlling means, and the trailer comprising the harvester, combined with means for communicating rotary motion from the motor to the trailer, and control means on the tractor and trailer respectively, comprising clutches and operating means whereby the operator can uncouple at will the transmission to the driving means or to the harvester.

3. In an auto-motor harvesting machine comprising a tractor and trailer, the tractor comprising in combination a motor, traction wheels hung on vertical pivots, a bridge connecting them, a differential gear carried by said bridge, a divided axle communicating movement from the differential to the traction wheels, and comprising universal joints coinciding with the vertical pivots of said wheels, and transmitting mechanism for communicating rotation from the motor to said differential gear.

4. In an auto-motor harvesting machine comprising a tractor and trailer, the tractor comprising in combination a motor, traction wheels hung on vertical pivots, a bridge connecting them, a differential gear carried by said bridge, a divided axle communicating movement from the differential to the traction wheels and comprising universal joints coinciding with the vertical pivots of said wheels, and transmitting mechanism comprising a shaft driven by the motor having connections extending to the harvester and a shaft driven therefrom and extending forwardly to the differential gear.

5. In an auto-motor harvesting machine comprising a tractor and trailer, with a longitudinal shaft for communicating rotation from the motor to the trailer, the combination therewith of means under control of the operator on the trailer for disconnecting the driving connection from the tractor wheels.

6. In an auto-motor harvesting machine comprising a tractor and trailer, with a longitudinal shaft for communicating rotation from the motor to the trailer, the combination therewith of connections for driving the traction wheels of the trailer, and controlling means for disconnecting such connection at will.

7. In an auto-motor harvesting machine comprising a tractor and a trailer, the latter carrying the harvester with its cutter bar, the combination therewith of a shaft for communicating rotation from the motor to the trailer, connections therefrom for driving the harvester, and controlling means for disconnecting such connections in order to stop the operation of the harvester at will.

8. In an auto-motor harvesting machine comprising a tractor, trailer and intervening mechanism for communicating power from the tractor motor to the trailer, the trailer comprising a harvester, and means for driving the latter comprising a one-way clutch adapted to drive the harvester during only the forward movement of the machine, with reversing mechanism for driving the machine backward whereby the backing of the machine is accomplished without driving the harvester.

In witness whereof I have hereunto signed my name in the presence of two subscribing witnesses.

ERNEST HENRI NARCISSE BONNET.

Witnesses:
 ANSELINE BOISHUS,
 CHAS. P. PRESSLY.